Nov. 7, 1967  S. F. MALAKER ETAL  3,351,063
CRYOSURGICAL PROBE
Filed Dec. 8, 1964
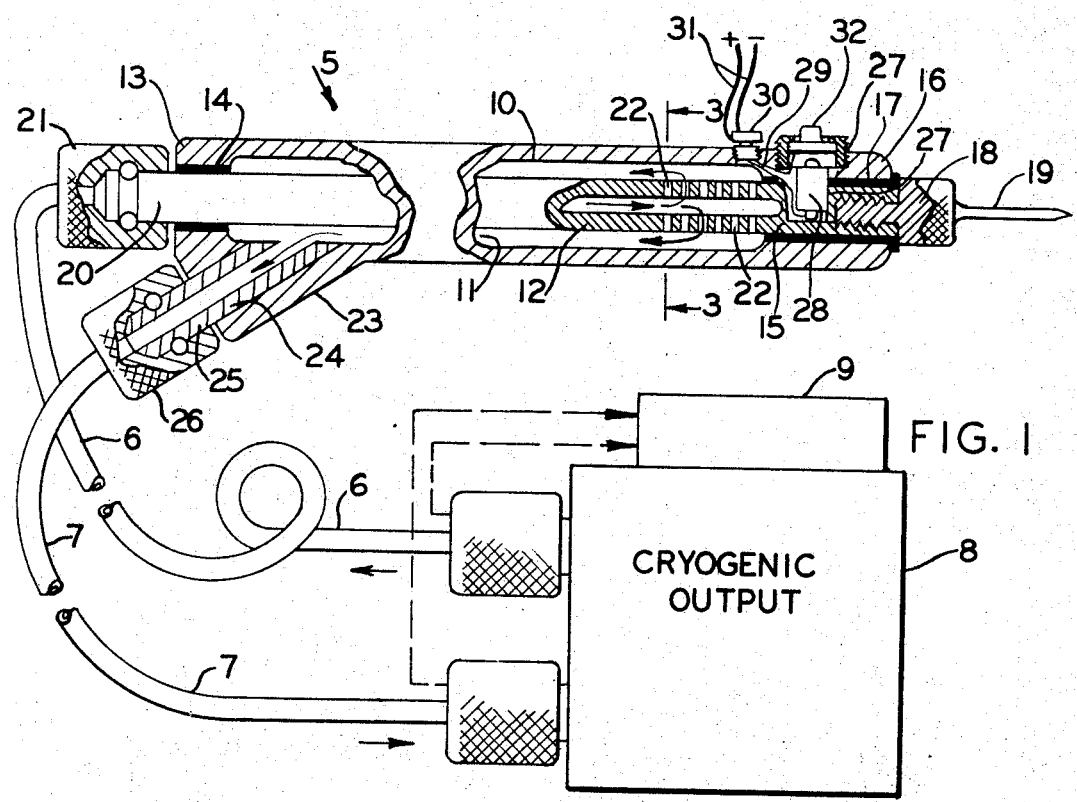
FIG. 1
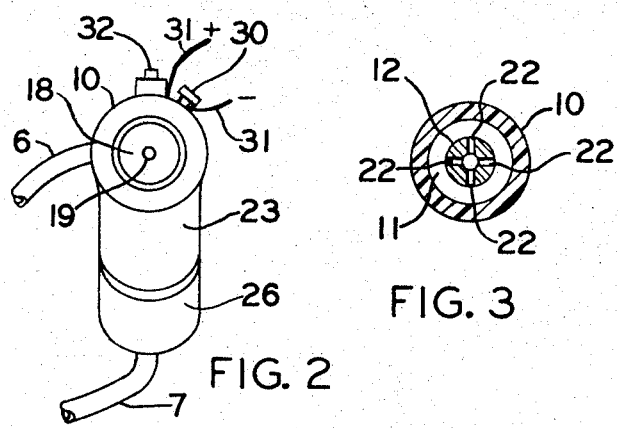
FIG. 2
FIG. 3
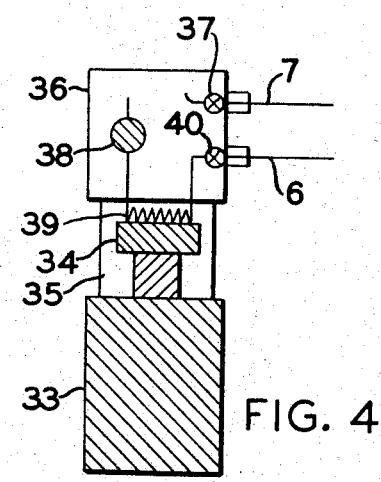
FIG. 4
INVENTORS
STEPHEN F. MALAKER
JOHN G. DAUNT
BY
ATTORNEY United States Patent Office 3,351,063
Patented Nov. 7, 1967

3,351,063
CRYOSURGICAL PROBE
Stephen F. Malaker, 330 Short Drive, Mountainside, N.J. 07092, and John G. Daunt, 4725 Olentangy Blvd., Columbus, Ohio 43214
Filed Dec. 8, 1964, Ser. No. 416,781
2 Claims. (Cl. 128—303.1)

This invention deals with a probe device operated at very low temperatures. More specifically, it relates to a probe having a surgical tip which may be cooled to very low temperatures, and heated instantly, if desired.

Recent surgery techniques are now including the use of a probe subjected to low temperatures for freezing and removing localized growths or tissues. For example, the Kelman Cryostylet, used for ophthalmic surgery, employs a thermoelectrically-cooled stylet, operating on the theory that warm, moist tissue, such as a lens, will adhere firmly to a cold stylet. In "Medical World News," for Sept. 25, 1964, pp. 79-91, there are disclosed various bloodless, nontraumatic operations which may be effected by cryosurgery.

Unfortunately, the probes now available for such use are quite heavy and are not adapted for very low temperatures which would be needed for treatment of Menier's disease or Parkinson's disease, for example. Some techniques now even use the cumbersome and dangerous technique of employing liquid nitrogen from an open bottle.

According to the present invention, a cryosurgical probe has been developed which is light and easy to manipulate. Also, it is adapted to be cooled to very low temperatures, such as −40° C. to −50° C., or even −80° C. or −200° C. or even lower, which enables the use of necrosis to relieve Parkinsonian tremor, for example. An important feature of the present invention is the provision for instant heating at the cold tip of the probe, thus making it possible to quickly remove tissue from the tip.

A further important feature of the present invention is the fact that the probe of the present invention may be readily combined with a cryogenic engine, such as one operating on a modified Stirling cycle, to produce a very light, compact, readily-operated system which is easily transported, quickly started, and is free of operating difficulties.

The invention will be more readily understood by reference to the accompanying drawings in which a preferred embodiment is described, and in which FIGURE 1 depicts a side view, partly cut away and in cross-section, of a cryosurgical probe of the present invention. A front view thereof is illustrated in FIGURE 2, while FIGURE 3 presents a cross-sectional front view taken along the plane of line 3—3 in FIGURE 1. FIGURE 4 shows a schematic drawing of a cryogenic engine of the modified Stirling cycle type, as adapted to feed cold liquid to the probe of FIGURES 1–3. The same numerals refer to similar parts in the various figures.

Referring again to the drawing, numeral 5 denotes generally a probe of the present invention, as connected by liquid transfer lines 6 and 7 to a cryogenic output, designated generally and schematically as 8, which output is designed to be controlled by electronic controls, referred to generally and schematically by numeral 9.

Probe 5 comprises a hollow body 10 made of insulated or insulating material which is mechanically stable at low temperatures and is resistant to disinfecting and cleaning materials, such as alcohol, chlorine, and the like. Such a body may be an evacuated glass body 10 having a hollow center 11, or it may be a body of tetrafluoroethylene or other fluoropolymer which withstands exceedingly low temperatures, or any other suitable material. Concentrically mounted in spaced relation within body 10 is an inlet tube 12 of smaller diameter, which may be of similar material, or of metal. Inner inlet tube 12 enters closed end 13 of body 10, and is preferably separated therefrom by a resilient gasket 14.

Tube 12 has a closed end at 15, and this end penetrates the otherwise closed end 16 of body 10. End 15 of tube 12 is desirably of high conductivity metal which is separated from body end 16 by a resilient gasket 17. Attached to end 15 of tube 12 (by screw threads or otherwise) is probe end 18, made of copper or some other highly conductive material. This probe end is preferably provided with a removable and interchangeable highly conductive contact tip 19, which tip is used to contact the tissue to be frozen. Tip 19 is interchangeable with other tips having different shapes or configurations, depending on the type of surgery to be performed.

The open end 20 of tube 12 is provided with a conventional quick-disconnect coupling 21 which enables coupling or disconnection of tube end 20 with flexible refrigerant supply tube or line 6. Near its closed end 15, tube 12 is provided with one or more series of radial holes 22 (FIG. 3).

The rear end of body 10 is provided with a connecting tubular side arm 23 which is also made of the same material as body 10, and within this side arm, in outside sealed relation, is inserted outlet tube 24 having exposed end 25, also provided with a conventional disconnect coupling 26, which latter serves to connect or disconnect end 25 with flexible refrigerant discharge line or tube 7.

From the foregoing, it can be seen that as the cryogenic output 8 (controlled through electronic controls 9) forces refrigerant liquid through line 6, the refrigerant enters tube 12 and discharges therefrom through the radial holes 22, while at the same time cooling down tube end 15, probe end 18 and probe tip 19. In this heat exchange operation, much, if not all, of the liquid refrigerant (such as liquid nitrogen) is vaporized. The thus-vaporized coolant leaving through holes 22 (as indicated by the arrows), passes through annular space 11 and discharges through arm tube 24 and out through discharge line 7, from which it is fed into the cryogenic output for recooling and condensation.

A supplemental feature shown in FIG. 1, is an opening 27 in body 10 through which is inserted, into a well of tube end 15, a heating unit, such as zener diode 28. Electrical leads 29 from this diode are connected to binding posts or other connection means 30 to which an outside source of electricity may be fed through lines 31. A conventional spring-loaded push button switch 32 may be mounted on body 10 to energize the diode to provide quick heating of probe tip 19 in emergencies, or when it is desired to remove quickly the adhered tip from the tissue. The zener diode may be provided with a sensor which is designed to measure and control the heat, as desired.

The manner of cooling the refrigerant (such as nitrogen) for the probe, is outlined schematically in FIG. 4. A cryogenic engine 33, such as one operating in accordance with a modified Stirling cycle (e.g., such as that described in U.S. Patent 3,074,244), has its cold head 34 enclosed in a vacuum-insulated compartment 35. Above this compartment is a dome 36 into which is fed the refrigerant discharged from line 7 leading out of probe 5. This line terminates with a one-way absolute pressure valve 37 within dome 36, through which valve the refrigerant vapor is discharged into dome 36. Gas circulator pump 38, within dome 36, picks up and circulates the gaseous refrigerant through coil 39 in heat exchange contact with the cold head 34 of the engine, whereupon the liquefied refrigerant passes from the vacuum chamber 35 into dome 36, through solenoid valve 40, and out through line 6 and into the probe 5. The system is relatively simple and is not space-consuming, when compared to other cryogenic systems in use at present.

We claim:
1. A cryosurgical probe, comprising:
   a tubular body made of insulating material, and having closed ends,
   a tube open at one end and penetrating the rearward end of said body in outside sealing relation and passing through said body in spaced relation so as to leave an annular space therebetween, and having its other end closed within said body, said closed end being made of highly heat conductive material and penetrating the forward end of said body in outside sealing relation,
   a series of radial holes in said tube adjacent said closed end,
   a hollow arm made of insulating material connecting the rear wall of said body with the said annular space therein and in outside sealing relation,
   connecting means for connecting a refrigerant feed line to the open end of said tube for feeding a refrigerant therethrough,
   connecting means for connecting a discharge refrigerant line to the end of said hollow arm for leading away a refrigerant which had passed through said tube holes and said annular space,
   a conductive probe tip designed to be cooled by the tube end which, in turn, is cooled by a refrigerant,
   a zener diode heating means mounted through the wall of said body in outside sealing relation therewith and into the closed end of said tube immediately above and adjacent to said tip and designed to provide instantaneous heat to said probe end, and
   a switch on said body for energizing said heating means.

2. A cryosurgical probe according to claim 1 in which the heating means comprises a zener diode and sensor.

References Cited

UNITED STATES PATENTS

| | | | |
|---|---|---|---|
| 1,652,954 | 12/1927 | Pierce | 128—401 |
| 2,938,130 | 5/1960 | Noll | 307—88.5 |
| 3,007,473 | 11/1961 | Jackson et al. | 128—400 |
| 3,101,596 | 8/1963 | Rinia et al. | 62—6 |
| 3,254,838 | 6/1966 | Chambers | 165—27 X |

OTHER REFERENCES

I. S. Cooper: Cryogenic Surgery of the Basal Ganglia, August 1962, pp. 600–604, J.A.M.A. 128–303.

Journal of the American Geriatrics Society, vol. 9, August 1961, pp. 714–718 relied upon.

RICHARD A. GAUDET, *Primary Examiner.*

G. E. McNEILL, *Assistant Examiner.*